No. 897,545. PATENTED SEPT. 1, 1908.
M. C. A. LATOUR.
SINGLE PHASE COMMUTATOR MOTOR.
APPLICATION FILED MAR. 11, 1907.

WITNESSES
Lester H. Fulmer.
J. Ellis Glenn

INVENTOR
MARIUS C. A. LATOUR
BY Albert G. Davis
ATTY.

UNITED STATES PATENT OFFICE.

MARIUS C. A. LATOUR, OF PARIS, FRANCE, ASSIGNOR TO GENERAL ELECTRIC COMPANY, A CORPORATION OF NEW YORK.

SINGLE-PHASE COMMUTATOR-MOTOR.

No. 897,545.

Specification of Letters Patent.

Patented Sept. 1, 1908.

Application filed March 11, 1907. Serial No. 361,883.

*To all whom it may concern:*

Be it known that I, MARIUS C. A. LATOUR, a citizen of France, residing at Paris, France, have invented certain new and useful Improvements in Single-Phase Commutator-Motors, of which the following is a specification.

My invention relates to single-phase motors of the commutator type, and its object is to provide such motors with a commutating field without employing a special winding for this purpose.

As is well known in the art, the design of alternating current motors presents difficulties in respect to commutation, which do not exist in the design of direct current motors. It has, consequently, been proposed heretofore to employ special coils for producing a commutating field adapted to be cut by the coils short-circuited by the commutator brushes, and of the proper amount and phase to assist in commutation.

My invention consists in so arranging the field coils that they themselves produce the desired commutating field. I accomplish this result by de-phasing the currents in adjacent field coils so that these currents produce a commutating field in the space between adjacent sides of the coils.

Figure 1:
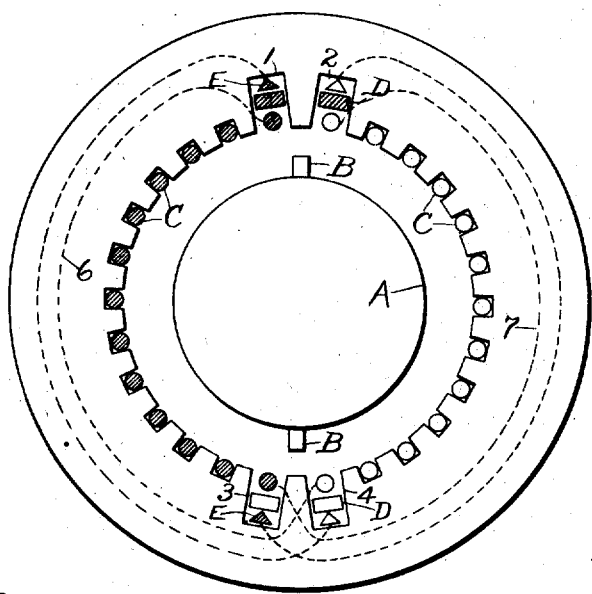
Figure 2:
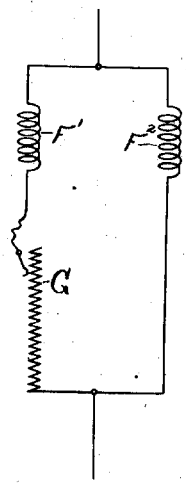

My invention comprises a number of features which will best be understood by reference to the accompanying drawings, in which Figure 1 shows diagrammatically an alternating current commutator motor with the desired current distribution in the field magnet for compensating for armature reaction, producing the cross-magnetization of the motor, and producing a commutating field; Fig. 2 shows diagrammatically the preferred method of securing the relative phase-displacement in the adjacent field coils; and Fig. 3 shows diagrammatically a motor arranged in accordance with my invention, and provided with a suitable reversing switch.

Referring first to Fig. 1, A represents the armature provided with the commutator brushes B B, C represents a compensating winding distributed around the field magnet and carrying current of proper amount and phase to neutralize the armature reaction, D represents the main field coils, which produce the cross-magnetization of the motor, and E represents coils for producing the commutating field for the armature coils short-circuited by the brushes. The conductors on the field magnet are shown in cross-section, and to distinguish them, the conductors of the different windings are shown with different forms of cross-section. The conductors of the compensating winding are shown as circles, the main field coils as rectangles, and the commutating coils as triangles. Furthermore, the relative directions of current in the several conductors of each winding are shown by shading. For instance: If, in the unshaded conductors of the compensating winding C the current at any instant is assumed to be passing upwards from the plane of the paper, the current in the shaded conductors will be passing downward. The main field coils D are placed in slots 1, 2, 3 and 4. These slots are separated by magnetic lugs or teeth, which form the poles for the commutating field. If the currents in the conductors in slots 1 and 2 are compared, it will be seen that in the compensating winding conductors the current is passing upward in slot 2 and downward in slot 1; while in the conductors of the field coil D the current is passing downward in both slots. The main field coils D are ordinarily connected in series with the commutating winding; so that the currents of these coils are in phase. Consequently, the currents in the compensating winding conductors and field coil conductors in slot 2 oppose each other, while the currents in the corresponding conductors in slot 1 assist each other. The currents in the conductors of the commutating coil E are in opposite directions in slot 1 and 2; and furthermore, to secure a commutating field of the proper phase, these currents should be out of phase with the currents in the compensating winding and main field coils. Consequently, considering the ampere conductors, as a whole, in slots 1 and 2, it will be seen that the currents in these slots differ both in magnitude and in phase. Now, comparing the currents in these slots with the currents in slots 3 and 4, it will be seen that the currents in slots 1 and 4 are of the same magnitude, and are displaced in phase 180°. Similarly, the currents in slots 2 and 3 are equal in magnitude and are displaced in phase 180°. Therefore, if the conductors in slot 1 are connected in series with the conductors in slot 4 to form a single coil as indicated by the dotted lines 6, and if the conductors in slot 2 are connected in series with the conductors in slot 3, as indicated by the dotted lines 7, so as to form a second single coil, and if the currents in the two single coils thus formed are each adjusted in magnitude and phase so that the ampere conductors in each slot are the same as those which would be produced by the arrangement of Fig. 1, it is evident that these two coils will serve not only as main field coils, but also to produce a commutating field of the proper amount and phase, and to assist in forming the compensating winding. It should be noted that in order that the field coils should thus act to produce the commutating fields, they should overlap on one side only. In Fig. 1 the overlapping is shown at the bottom of the figure.

To produce the desired difference in amount and phase in the currents in the adjacent field coils, the connection shown in Fig. 2 may be employed. In this figure $F^1$ and $F^2$ represent the field coils formed by consolidation of the ampere conductors in the field coil slots, as described above. These coils are connected in parallel, and the impedance G is placed in series with one of the coils. By adjusting the amount of this impedance, the relative amounts and phases of the currents in the two field coils may be adjusted to produce the desired commutating field.

Figure 3:
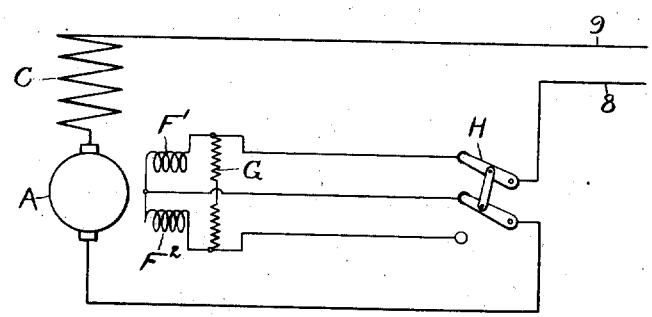

In Fig. 3 I have shown the connections of a compensated series motor with the field coils arranged as in Fig. 2. I have also shown a reversing switch H, adapted both to reverse the direction of current through the field coils relatively to the armature, and also to shift the impedance G into series with the two field coils alternately. The two field coils are connected directly together at one terminal, and are connected together through the impedance G at their other terminal. With the switch H in the position shown, the current enters from the conductor 8 through the switch H to the junction of field coil $F^1$ and impedance G. From this point, part passes through field coil $F^1$, back to the other pole of switch H, while the other part of the current passes through impedance G and field coil $F^2$ in series. From the other pole of switch H current passes through the armature A and compensating winding C to the conductor 9. With the switch H in its other position, the conductor 8 is connected to the terminals of field coils $F^1$ and $F^2$ which are directly connected to each other, while the lower armature brush is connected to the lower terminal of impedance G. Impedance G is consequently now in series with field coil $F^1$, while the relative direction of current through the field coils with respect to the armature is reversed. Thus, switch H serves both to reverse the torque of the motor, and to make the necessary change in the phase of the commutating field to adapt it for the opposite direction of rotation.

It will be understood that I have illustrated my invention diagrammatically, for the sake of simplicity, and that in practice any well known form of bipolar or multipolar construction may be employed.

What I claim as new and desire to secure by Letters Patent of the United States, is,—

1. A single-phase motor of the commutator type having in combination with its main field coils connections adapted to produce a relative phase-displacement of the currents in the main field coils for adjacent poles whereby a commutating field is produced in the space between the adjacent sides of said coils.

2. A single-phase motor of the commutator type having its main field coils for adjacent poles separated by a lug or tooth, and connections for said coils adapted to produce a relative phase-displacement of the currents in the conductors of said coils on opposite sides of said tooth whereby a commutating field is produced in said tooth.

3. A single-phase motor of the commutator type having main field coils for adjacent poles connected in parallel, and an impedance in series with one of said coils adapted to produce a relative phase-displacement of the currents in said coils, whereby a commutating field is produced in the space between the adjacent sides of said coils.

4. A single-phase motor of the commutator type having main field coils for adjacent poles separated by a lug or tooth and connected in parallel circuits, and an impedance in series with one of said coils adapted to produce a relative phase-displacement of the currents in said coils, whereby a commutating field is produced in said tooth.

5. A single-phase motor of the commutator type having main field coils for adjacent poles connected in parallel circuits and means in circuit with said coils for producing a relative displacement of the currents in said coils, whereby a commutating field is produced in the space between the adjacent sides of said coils.

6. A single-phase motor of the commutator type having field coils each of which has one of its sides and one only overlapping a field coil for an adjacent pole, and connections adapted to produce a relative-phase-displacement of the currents in the field coils for adjacent poles whereby commutating fields are produced in the spaces between the adjacent sides of said coils.

7. A single-phase motor of the commutator type having field coils each of which has one of its sides and one only overlapping a field coil for an adjacent pole, connections adapted to produce a relative phase-displacement of the currents in the field coils for adjacent poles, whereby commutating fields are produced in the spaces between the adjacent sides of said coils, and magnetic lugs or teeth occupying said spaces.

8. A single-phase motor of the commutator type having field coils each of which has one of its sides and one only overlapping a field coil for an adjacent pole, field coils for adjacent poles being connected in parallel circuits, and means in circuit with said coils for producing a relative phase-displacement of the currents in field coils for adjacent poles whereby commutating fields are produced in the spaces between the adjacent sides of said coils.

9. A single-phase motor of the commutator type having field coils each of which has one of its sides and one only overlapping a field coil for an adjacent pole, field coils for adjacent poles being connected in parallel circuits, means in circuit with said coils for producing a relative phase-displacement of the currents in the field coils for adjacent poles whereby commutating fields are produced in the spaces between the adjacent sides of said coils, and magnetic lugs or teeth occupying said spaces.

10. A single-phase motor of the commutator type having field coils for adjacent poles connected in parallel, an impedance in series with one of said coils adapted to produce a relative phase-displacement of the currents in said coils, whereby a commutating field is produced in the space between the adjacent sides of said coils, and a switch arranged to reverse the direction of current through said coils relatively to the armature and to shift said impedance into series with the other of said coils.

11. A single-phase motor of the commutator type having field coils for adjacent poles separated by a lug or tooth and connected in parallel circuits, an impedance in series with one of said coils adapted to produce a relative phase-displacement of the currents in said coils, whereby a commutating field is produced in said tooth, and a switch arranged to reverse the direction of current through said coils relatively to the armature and to shift said impedance into series with the other of said coils.

12. A single-phase motor of the commutator type having field coils for adjacent poles connected directly together at one terminal and through an impedance at the other terminal, and a switch adapted in one position to connect one current lead to the directly-connected coil terminals and a second current lead to one terminal of the impedance and in another position to connect the first current lead to the other terminal of said impedance and the second current lead to the directly-connected coil terminals.

In witness whereof, I have hereunto set my hand this 26th day of February, 1907.

MARIUS C. A. LATOUR.

Witnesses:
DEAN B. MASON,
JOHN BAKER.